Patented Apr. 23, 1940

2,198,017

UNITED STATES PATENT OFFICE 2,198,017

PREPARATION OF PRINTING PLATES

Alfred Schlesinger, Hampstead, London, England

No Drawing. Application April 13, 1938, Serial No. 201,849. In Great Britain May 11, 1937

6 Claims. (Cl. 41—41.5)

This invention relates to improvements in or relating to the preparation of printing plates.

Lithographic printing plates are usually prepared by one of the following methods:

(a) The negative copy process. In this process an albumin print is prepared from a negative by exposing to light a metal plate covered with bichromated albumin under the negative. The print may likewise be prepared, using instead of bichromated alubumin another substance capable of being hardened and rendered water-insoluble on being exposed to light. The plate thus prepared is inked, washed with water to remove the non-hardened parts, gummed and dried. This produces a gum stencil and the ink is then washed out with an ink-removing agent such as turpentine.

(b) The transfer process. A fatty picture is provided on a plate by direct or indirect printing. The inked plate is then gummed and dried and the ink washed out with an ink-removing agent such as turpentine.

(c) The diapositive or deep etch process. A copy is prepared through a diapositive on a plate coated with a bichromated colloid whereby the non-printing parts are hardened. The image portions are then washed out with water or other solvent.

It is known to apply to plates prepared according to the methods (a), (b) and (c) above a varnish such as shellac, Celluloid-lacquer, copal and the like, or asphalt to protect the printing parts. The varnish is applied over the whole surface and is therefore relatively thinner over portions which are protected by the gum or the unremoved colloid layer. If a strong varnish, that is to say a pure varnish containing little or no greasy matter, is used, there is great difficulty in removing the varnish from the parts of the plate which are not to be protected without damaging those parts which are to be protected. It is however desirable to use a strong varnish and the difficulties which arise when such a strong varnish is used may be avoided according to the present invention wherein in the process for the production of lithographic plates or printing plates which are to be etched, where an agent such as varnish or asphalt is spread over the plate and used to protect desired parts thereof, there is used a weak solution of a solvent for the protecting agent, to wipe the coat of protecting agent and thin it on the parts which are to be removed.

According to a further embodiment of the invention a weak solution of a solvent for the protecting agent may be applied to the surface of the plate before the application of the protecting agent.

Thus for example if shellac is used as a protective agent a suitable wiping liquid could consist of one part of spirit, such as ethyl alcohol, mixed with 99 parts of water or castor oil or glycerine or an aqueous calcium chloride solution or oil of turpentine, etc. This solution is so weak that the varnish covering the light hardened parts of the plate will only be slightly removed, without affecting its protective properties.

Thus the surface will be thinned out at the same time as being rendered fatty. When washed off with water for example the varnish which has been thinned out is easily removed from the non-printing surface, but will remain in the recesses or stencil openings where there is a greater thickness of varnish, only the surface of which will have been disturbed by the weak solvent.

During the preparation of lithographic printing plates it is advantageous to use a greasy solution (a solution containing a greasy substance such as castor oil) for removing the varnish layer from the non-printing parts since it applies fat to the surface of the image and renders it sticky, forming a favourable base to which the subsequent ink layer readily adheres.

When particularly hard resins have to be removed the wiping solution may be applied to the whole surface of the plate before the application of the varnish. Thus the varnish does not adhere too strongly to the plate and may be more easily removed from the desired parts with further wiping solution.

The composition of the wiping solution is not limited to the aforementioned proportions which may be varied according to the strength and thickness of the coat to be removed.

In the case of negative copies where the printing image does not consist of metal but of a hardened colloidal substance, the plate can be treated immediately after exposure to the light or following development after the plate has been gummed and the ink washed off.

The invention is applicable to the manufacture of printing plates from positive or negative copy and from transfer. In the case of high-relief plates the varnish is coated over the negative. When deep etched plates are made the varnish is applied to the non-printing parts. In the case of negative and transfer plates the varnish is applied after the ink is washed off from the image the non-printing parts being protected by a coat of gum or, in the case of deep etched plates, with a hardened bichromate coat.

In the case of positive plates the varnish is applied after the printing parts in the hardened stencil have been developed. In this case the varnish is used for the so-called reversal.

When plates are prepared from positive copy there is the advantage that by the application of the layer of varnish and the use of the wiping solution according to the invention, there is no need to rub or roll in ink during the preparation of the plates.

Further by means of the present invention litho plates can be treated with protecting varnish to renew the image when the ink no longer adheres, directly on the printing machine without the necessity of removing the plates from the machine. The printing image is composed of a varnish which has a special affinity to stick to metal. There is no deep or high etching. This varnish image requires renewing from time to time. This renewal is effected in situ by gumming the plate, drying and washing with turpentine. This leaves a gum stencil. The solvent according to the invention is then smeared over the plate and coated over with varnish. This varnish layer is then wiped with the solvent and the stencil removed by development with water. A renewed varnish image remains.

The invention offers the advantage that hard and resistant masses are obtained with the elimination of the technical difficulties which have hitherto arisen.

What I claim is:

1. In the process for the production of lithographic and printing plates which are to be etched, in which a varnish is spread over the plate to form a protective coat thereon, the step of wiping the coat of varnish with a solution of a carrier substantially inert to varnish and containing a small proportion of a substance which is a solvent for the varnish, whereby the coating of varnish on the parts from which it is to be removed is rendered so thin that it becomes penetrable by water.

2. In a process according to claim 1, the further step of wiping the plate before the application of the coat of varnish with the said solution.

3. In the process for the production of lithographic printing plates in which a hard lacquer is spread over the plate as a protecting agent, the step of wiping the coat of hard lacquer with a solution containing a small proportion of a substance which is a solvent for the hard lacquer dissolved in a greasy substance whereby the coating of hard lacquer on the parts from which it is to be removed is rendered so thin that it becomes penetrable by water and renders the surface of the remainder of the plate greasy.

4. A process according to claim 1, wherein the solution consists of a small quantity of alcohol dissolved in castor oil.

5. In the process for the production of lithographic and printing plates which are to be etched, in which a varnish is spread over the plate to form a protective coat thereon, the step of wiping the coat of varnish with a solution consisting of about one part of alcohol dissolved in about 99 parts of castor oil, whereby the coating of varnish on the parts from which it is to be removed is rendered so thin that it becomes penetrable by water.

6. In a process according to claim 5, the further step of wiping the plate before the application of the coat of varnish with the said solution.

ALFRED SCHLESINGER.